United States Patent [19]
Coverston et al.

[11] Patent Number: 5,454,103
[45] Date of Patent: Sep. 26, 1995

[54] METHOD AND APPARATUS FOR FILE STORAGE ALLOCATION FOR SECONDARY STORAGE USING LARGE AND SMALL FILE BLOCKS

[75] Inventors: Harriet G. Coverston, New Brighton, Minn.; Donald D. Crouse, Murphy, Tex.

[73] Assignee: LSC, Inc., Minneapolis, Minn.

[21] Appl. No.: 12,029

[22] Filed: Feb. 1, 1993

[51] Int. Cl.$^6$ .................................................... G06F 12/02
[52] U.S. Cl. .................. 395/600; 364/282.2; 364/283.1; 364/DIG. 1; 395/497.01
[58] Field of Search ..................................... 395/600, 425, 395/700; 360/48

[56] References Cited

U.S. PATENT DOCUMENTS

| | | | |
|---|---|---|---|
| 4,536,837 | 8/1985 | Olson et al. | 395/600 |
| 5,276,840 | 1/1994 | Yu | 395/425 |
| 5,339,411 | 8/1994 | Heaton, Jr. | 395/600 |
| 5,375,233 | 12/1994 | Kimber et al. | 395/600 |

OTHER PUBLICATIONS

Leffler et al., "The Design and Implementation of 4.3 BSD Unix Operating System", (1990) chapter 7, pp. 187–213.
Bach, M., The Design of the Unix ™ Operating System, Chpts. 4–5 (1986) Prentice–Hall, pp. 60–145.
"The Uni–Tree™ Virtual Disk System: An Overview" General Atomics/Discos Division (1991).
"Epoch–1 Infinite Storage™ Server Technical Summary"; Epoch Systems, Inc. Rev. 11, (Jul. 1990).

Primary Examiner—Thomas G. Black
Assistant Examiner—Larry J. Ellcessor
Attorney, Agent, or Firm—Patterson & Keough

[57] ABSTRACT

A method and apparatus for file storage allocation for secondary storage systems for allocating storage space for both small and large files in the same file system that dynamically utilizes at least two different sizes of logical storage allocation units to organize files stored on one or more physical storage devices. A first, smaller logical allocation unit is used to allocate space for the beginning of files until the size of the file passes a predefined maximum small allocation unit size. Beyond the predefined maximum small allocation unit size for a file, a second, larger logical allocation unit is used to allocate the remaining space necessary to store the file. In the preferred embodiment, small allocation units of 1K and large allocation units of 16K are used to map files directly and indirectly to the physical storage devices in a secondary file storage system. Such that the addressable storage capacity in a secondary file storage system is maximized while the amount of unused storage space is minimized.

12 Claims, 5 Drawing Sheets

METHOD AND APPARATUS FOR FILE STORAGE ALLOCATION FOR SECONDARY STORAGE USING LARGE AND SMALL FILE BLOCKS

RELATED APPLICATIONS

This application is related to the following co-pending application, filed concurrently herewith and assigned to the same assignee, entitled "ARCHIVING FILE SYSTEM FOR DATA SERVERS IN A DISTRIBUTED NETWORK ENVIRONMENT", Ser. No. 08/012,298, filed Feb. 1, 1993, a copy of which is attached hereto and the disclosure of which is hereby incorporated by reference.

TECHNICAL FIELD

The present invention relates generally to secondary storage systems, such as disk drives, optical disk drives, tape drives and the like for computer processing systems. More particularly, the present invention relates to a method and apparatus for storage allocation for secondary storage systems that uses two or more sizes of logical storage allocation units for allocating space in which to store a file on the secondary storage system.

BACKGROUND OF THE INVENTION

The use of secondary storage systems to provide for online storage for a computer processing systems that is separate from the primary or main memory of the computer processing system is well known. Examples of current secondary storage systems include magnetic disk drives, optical disk drives, magnetic tape drives, solid state disk drives and bubble memories. Typically, secondary storage systems have much larger memory capacities than the main memory of a computer processing system; however, the access to data stored on most secondary storage systems is sequential, not random, and the access rates for secondary storage systems can be significantly slower than the access rate for main memory. As a result, individual bytes of data or characters of information are usually stored in a secondary storage system as part of a larger collective group of data known as a file.

Generally, files are stored in accordance with one or more predefined file structures that dictate exactly how the information in the file will be stored and accessed in the secondary storage system. In most computer processing systems, the operating system program will have a file control program that includes a group of standard routines to perform certain common functions with respect to readings, writing, updating and maintaining the files as they are stored on the secondary storage system in accordance with the predefined file structure. As used within the present invention, the term file system will refer collecting to the file structure and the file control program.

In the file systems of current operating system programs, the predefined file structure typically includes a control portion and a data portion that is associated with that control portion. The data portion of the file structure is split into one or more segments of logical blocks of data, with each logical block of data being allocated a single fixed memory size, such as 1K, 4K or 8K bytes. The division of the data portion into one or more logical blocks is done in order to facilitate access to different parts of a large file, and at the same time standardize the way in which data is handled by the standard routines of the file system. By analogy, the logical blocks of a data file can be thought of as individual pages of a book, each of which can be turned to individually, as opposed to having one long, continuous scroll of paper, where the information on the end of the scroll could be read only by unrolling the whole scroll. In addition, by dividing the file into two or more logical blocks of data, the file system allows for a file to be located in two or more smaller and separate physical locations in the secondary storage system, rather than requiring one large contiguous physical location to store the file.

In the standard file system of the Unix® System V, Release 3 operating system program, for example, the logical block size is 1K bytes. The control portion of the predefined file structure for the Unix® System V operating system program, known as the inode, contains a table of contents to locate the data for a file. In this file system, each block in the secondary storage system is addressable by a number, and the table of contents portion of the inode consists of a set of block numbers pointing to the blocks of data as they are stored in the secondary storage system. The standard routines of the file system access the desired data by locating that data within one or more of the blocks of data listed in the inode, and then performing their various functions by operating on a single block of data at a time. For a more detailed description of the file system of the Unix® System V operating system program, reference is made to Bach, M., *The Design of the Unix™ Operating System*, Chpts. 4–5 (1986) Prentice-Hall, pgs. 60–145.

One of the problems in using a small logical block size, such as the logical block size of 1K bytes for the standard Unix® file system, is that a large number of accesses to the file system are required whenever the desired data spans multiple numbers of blocks. In this situation, multiple repetitions of the various standard functions of the file system will be required in order to satisfy the file request. This results in increased overhead and decreased efficiency, particularly for large files. The increased overhead for large files is justified in this file system by the assumption that the vast majority of files stored in a secondary storage system are less than 10K bytes in size, and therefore the file system should be optimally designed to provide access to these small files.

An alternative to the use of a small logical block size is to increase the size of the logical block. For example, in the Berkeley 4.2 BSD file system, the system administrator can configure the operating system program to use a single, larger logical block size that stores all of the files in the file system in logical blocks that are each 4K bytes, or that stores all of the files in the file system in logical blocks that are each 8K bytes. The advantage of using a larger block size is that the file system can provide faster access, particularly for larger files. The disadvantage is that by having a larger block size, the file system increases block fragmentation, leaving large portions of the secondary storage system unused, especially when the large number of small files are to the stored in the secondary storage system. For instance, if the logical block size is 8K bytes, then a file of size 12K bytes use 1 complete logical block and half of a second logical block. It will be seen that if the average size of files in the file system is uniformly distributed, then the average wasted space will be a half a block per file, and the amount of wasted secondary storage space for the entire file system can be significant.

In the Berkeley BSD 4.2 file system, an attempt is made to reduce the impact of block fragmentation by allocating a special logical block to contain the ending block fragments of two or more flies. Thus, one logical block can contain the data for the ending block fragments of two or more different files. The problem with this approach is that the allocation and deallocation of the special logical blocks for block fragments can become complicated when one or more of the files having block fragments in the special logical block are altered or deleted from the system. This problem is aggravated when a large number of small files are to be stored in the secondary storage system.

The current file systems present the system administrator with a choice between designing the secondary storage system to operate more efficiently for the larger number of small files, or to operate more efficiently for a smaller number of large files. Although the current file systems have storage allocation systems and methods that are adequate for storing and accessing files on secondary storage systems, it would be desirable to provide a storage allocation system and method that could effectively and efficiently address the storage allocation requirements of both small and large files in the same file system.

SUMMARY OF THE INVENTION

The present invention provides an effective and efficient storage allocation method and apparatus for allocating storage space on a secondary storage system for both small and large files within the same file system. The present invention utilizes at least two different sizes of logical storage allocation units to allocate storage space for files stored on the secondary storage system. A first, smaller logical allocation unit is used to allocate space for the beginning of files until the size of the file passes a predefined maximum small allocation unit size. Beyond the predefined maximum small allocation unit size for a file, a second, larger logical allocation unit is used to allocate the remaining space necessary to store the file. The small and large logical allocations units are used by the file control program within the operating system program to map files directly and indirectly to the physical storage devices in the secondary storage system.

In response to a request to store a file of a given size, the method of the present invention first allocates one or more of a maximum number of small logical allocation units. The small logical allocation units represent a space of a first predefined size in the secondary storage system in which to store the file. The small logical allocation units are allocated until a total amount of the space represented by the small logical allocation units is greater than or equal to the given size of the file, or until a total number of the first logical allocation units is equal to the maximum number of small logical allocation units. If the total number of small logical allocation units is equal to the maximum number of small logical allocation units, then the present invention allocates an additional number of large logical allocation units until a total amount of the space represented by the combination of the small allocation units and the large allocation units is greater than or equal to the given size of the file. The large logical allocation units represent a space of a second predefined size in the secondary storage system in which to store the file that is larger than the first predefined size of the small logical allocation units.

In the preferred embodiment, small allocation units of 1K and large allocation units of 16K are assigned within the extent array portion of an inode structure for a System V compatible file system. The direct extent array in the inode structure provides direct allocation space for allocating sixteen 1K small allocation units and eight 16K large allocation units. Thus, files from as small as 1K bytes to as large as 144K bytes can be efficiently accessed by utilizing only the direct allocation space which is allocated with the unique combination of both small and large allocation units. In the preferred embodiment, indirect allocation space is also provided for up to three or more levels of indirect addressing. In the preferred embodiment, the indirect allocation space is allocated in terms of additional allocation blocks each capable of storing a total of 3,276 16K large allocation units, thus yielding a total addressable storage for any single file of greater than 500,000 Terabytes.

The use of the dual sizes of the logical allocation units of the present invention provides for efficient storage allocation and data transfer rates for both small and large files. For small files of less than about 10–16K bytes in size, space is allocated most efficiently using small logical allocation units, 1K block size, for example. If a larger block size is used, 4K or 8K block size, for example, then the file system wastes time in reading in large blocks that contain very little data and there is significant wasted space on the secondary storage system. In contrast, for files larger than about 10–16K bytes in size, the overhead associated with setting up and reading or writing many small block sizes, 1K block size, for example, quickly begins to degrade the overall data transfer rate for accessing a larger file. The present invention overcomes these deficiencies by providing a dual size storage allocation method and apparatus that can dynamically allocate both small and large logical allocation units for the same file, thereby taking advantage of the performance and efficiency characteristics inherent in both sizes of logical allocation units within the structure of a single file system.

Accordingly, it is a primary objective of the present invention to enhance file access performance and data transfer rates for large files while enhancing storage utilization for small files.

It is another objective of the present invention to increase the addressable storage capacity in a secondary file storage system, while minimizing the amount of unused storage space.

These and other objectives of the present invention will become apparent with reference to the drawings, the detailed description of the preferred embodiment and the appended claims.

DETAILED DESCRIPTION OF THE PREFERRED EMBODIMENT

The preferred embodiment of the dual size allocation units of the present invention is implemented as part of the file system for a large capacity network data server operating in distributed computer network environment executing a System V-compatible operating system program. In the file system of the preferred embodiment, each file is stored on the secondary storage system according to a file structure that includes a data portion for each file and a control portion known as an index node or inode. For a more detailed description of the preferred embodiment of the file system which utilizes the method and apparatus of the present invention, reference is made to the previously identified co-pending application entitled "ARCHIVING FILE SYSTEM FOR DATA SERVERS IN A DISTRIBUTED NETWORK ENVIRONMENT". It will be recognized, however, that the present invention is capable of use with any type of file system for a secondary storage system where storage space is logically allocated by assigning a plurality of blocks of storage of a predefined size in which to store files of varying sizes.

Figure 1:
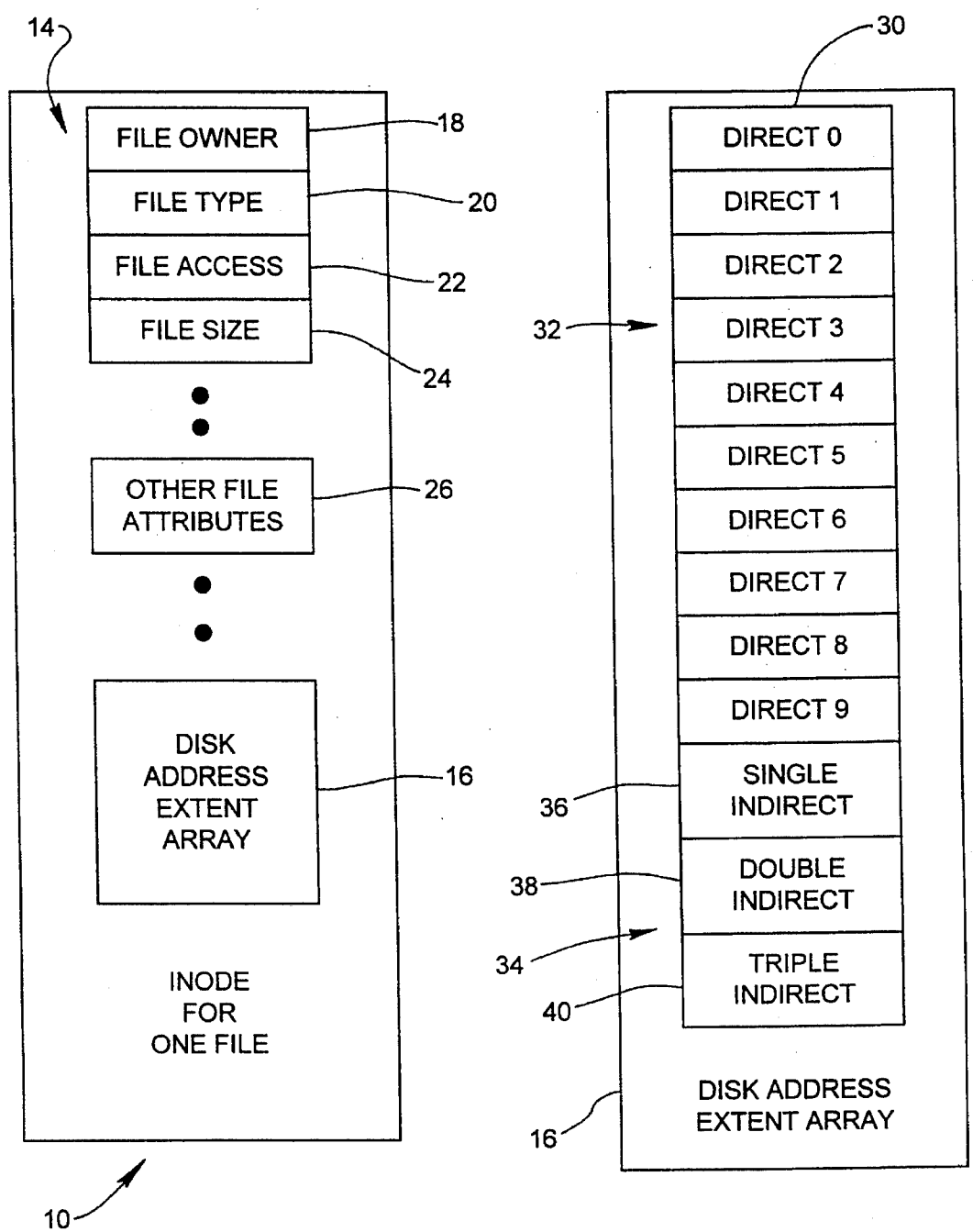
FIG. 1 is a block diagram of the arrangement of index nodes and disk address extent array for a prior art storage allocation method.

Referring now to FIG. 1, the file system of a prior art file storage allocation systems includes an inode 10 and one or more logical storage blocks 12 stored on a single physical storage device, such as a tape drive, hard disk drive or removable media, such as a CD-ROM or other optical disc. In typical prior art systems, up to 16 inodes are stored in a single logical block of 64 bytes. The inode 10 includes a plurality of file attributes 14 and the disk address extent array 16. The file attributes 14 include, for example, file ownership information 18, file type information 20, file access information 22, file size information 24 and other file attribute information 26.

The disk address extent array 16 includes the data block addresses 30 for the logical storage blocks 12 of a file. In a typical prior art system, the logical storage blocks 12 are of a single fixed size, such as, for example, 1K bytes and the inode 10 contains a fixed number of data block addresses 30, such as, for example thirteen data block addresses. The data block addresses 30 map the logical storage blocks 12 onto the physical storage device storing the file.

In the System V Unix® prior art file system, the disk address extent array 16 includes data block addresses 30 for direct storage blocks 32 and indirect storage blocks 34. Each of the data block addresses 30 for both the direct storage blocks 32 corresponds to areas of physical storage devices containing file data. Each of the indirect storage blocks 34 contains a data block address 30 that it is a pointer to another data block of direct or indirect storage blocks. The indirect storage blocks 34 include a single indirect block 36, a double indirect block 38 and a triple indirect block 40. The single indirect block 36 lists data block addresses 30 of areas of physical storage device containing data. The double indirect block 38 includes data block addresses 30 of a set of single indirect blocks 36. The triple indirect data block 40 includes data block addresses 30 to a set of double indirect data blocks 38. The indirect storage blocks 34 enable the inode 10 to address physical storage space for files of a size greater than the total storage space addressable by the direct storage blocks 32. Thus, if each logical storage block 12 is 1K bytes, the System V Unix® file system can address over 16G bytes of data stored on a single file system (each direct=1K; each single indirect=256×1=256K bytes; each double indirect=256×256=65.5M bytes; each triple indirect=256×256×256=16.7 G bytes).

Figure 2:
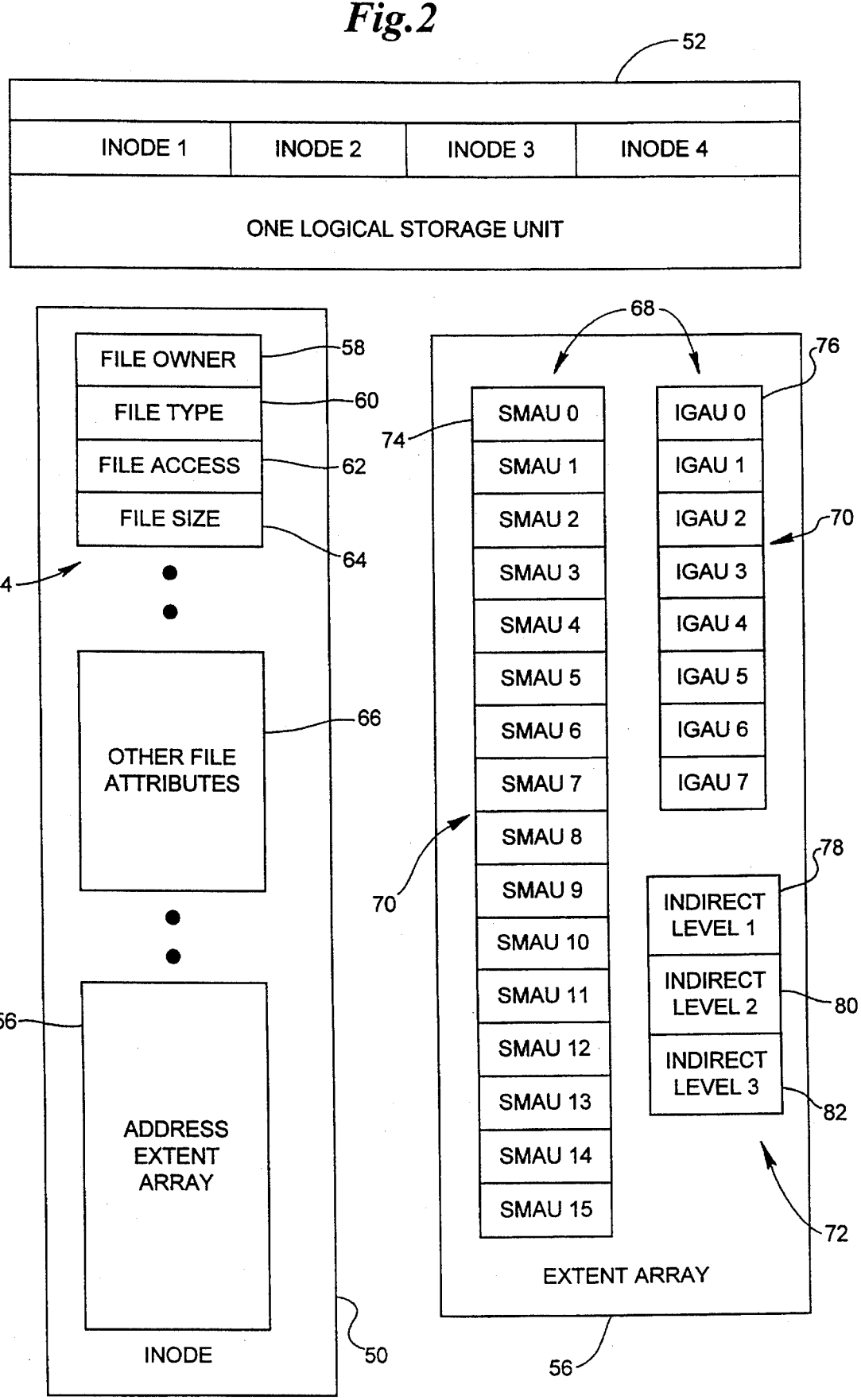
FIG. 2 is a block diagram of the arrangement of index nodes and disk address extent array for the preferred embodiment of the dual size allocation units of the present invention.

Referring now to FIG. 2, a file storage allocation system in accordance with the present invention includes an inode 50 and a plurality of logical storage allocation units 52. In the preferred embodiment, the inode 50 need not be stored on the same physical storage device as the file. In the preferred embodiment, four inodes 50 of 256 bytes each are stored per logical 1K block. The inode 50 includes a plurality of file attributes 54 and the extent array 56. The file attributes 54 include, for example, file ownership information 58, file type information 60, file access information 62, file size information 64 and other file attribute information 66. A more detailed description of the file attributes 54 within the inode 50 is provided in the previously identified copending application and is incorporated herein by reference.

In the preferred embodiment of the present invention, the extent array 56 includes data addresses 68 which represent logical storage allocation units 52 as defined on the actual physical storage devices. A further step of transforming the logical block data address 68 to one or more actual physical addresses in the form of cylinder and sector number on a disk drive, for example, is typically performed by a device controller. It will be recognized, however, that the present invention contemplates that the block allocation information stored in the extent array 56 could be either logical address information or actual physical address information, or even some combination of logical and physical address information.

In the preferred embodiment, the data addresses 68 for the logical storage units 52 include data addresses 68 for direct allocation units 70 and for indirect level pointers 72. The direct allocation units 70 include a plurality of small allocation units (smau) 74 and a plurality of large allocation units (lgau) 76. In the preferred embodiment, each small allocation unit 74 is a logical storage unit 52 of 1K byte in size and each large allocation unit 76 is a logical storage unit 52 of 16K bytes in size. In this embodiment, the direct allocation units 70 include sixteen small allocation units 74 and eight large allocation units 76.

It will be recognized that the logical storage unit 52 can have a one-to-one relationship with designated storage areas of a particular physical storage device, or there may be a one-to-multiple relationship with multiple designated physical storage areas on another physical storage device (or devices) comprising a single logical storage unit 52. In one embodiment, for example, a storage device such as a disk cylinder may be partitioned so that the designated storage areas at the beginning of the cylinder correspond in a one-to-one relationship with the small allocation units 74 and the designated storage areas in remaining portion of the cylinder directly correspond with the large allocation units 76. Because the file system accesses the data on the storage device in terms of logical allocation units 74, 76 the advantages of the present invention will be realized, regardless of whether there is a one-to-one or one-to-multiple correspondence between size of the allocation units 74, 76 and the size of the designated physical storage areas.

In the preferred embodiment, the indirect level pointers 72 include a plurality of first indirect level pointers 78, second indirect level pointers 80 and third indirect level pointers 82. In the preferred embodiment, each indirect level pointer 72 is a large allocation unit 76. Each first indirect level pointer 78 stores the data address of the direct allocation units 70. Each second indirect level pointer 80 stores the data address of a set of first indirect level pointers 78. Each third indirect level pointer 82 includes the data address of a set of second indirect level pointers 80.

The information contained in the extent array 56 is stored in the inode 50 as byte addresses that are right shifted 10 bits (1024) whereby the byte addresses delineate units of 1024 bytes or, in this case, the small allocation unit 74. Information for any particular logical storage unit 52 is stored as 4 bytes of byte address and 1 byte that defines the logical disk ordinal for implementing the disk set feature as described in greater detail in the previously-identified co-pending application. In this way, a total of 3,276 pointers to additional storage units 52 can be stored in a single 16K indirect level pointer 72, i.e. 16K/4/5 bytes per allocation extent. In this embodiment, the total addressable storage space exceeds 500,000 Terabytes.

In operation, when a file control processor (not shown) receives a request to retrieve a file, the file control processor accesses the data in the file by calculating the location of the logical allocation unit 52 on a particular storage device from the data block addresses 68 in the extent array 56 of the inode 50 through the well-known technique of byte offset. Those skilled in the art will recognize that the logical disk ordinal for implementing the disk set feature as described in greater detail in the previously-identified co-pending application provides the starting point for calculating the appropriate byte offset.

Figure 3:
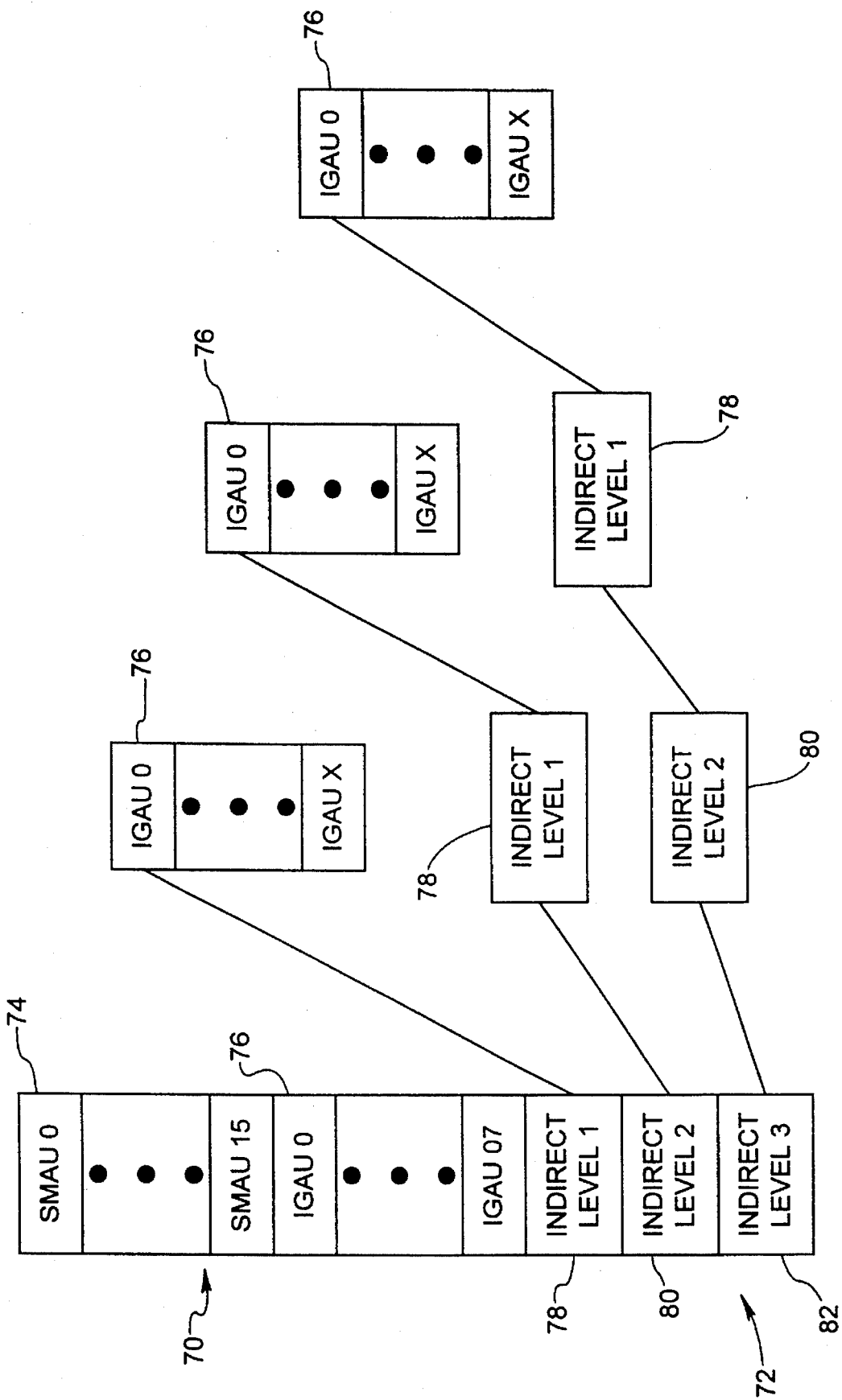
FIG. 3 is a block diagram showing how indirect addressing is accomplished using the preferred embodiment of the dual size allocation units of the present invention.
Figure 4:
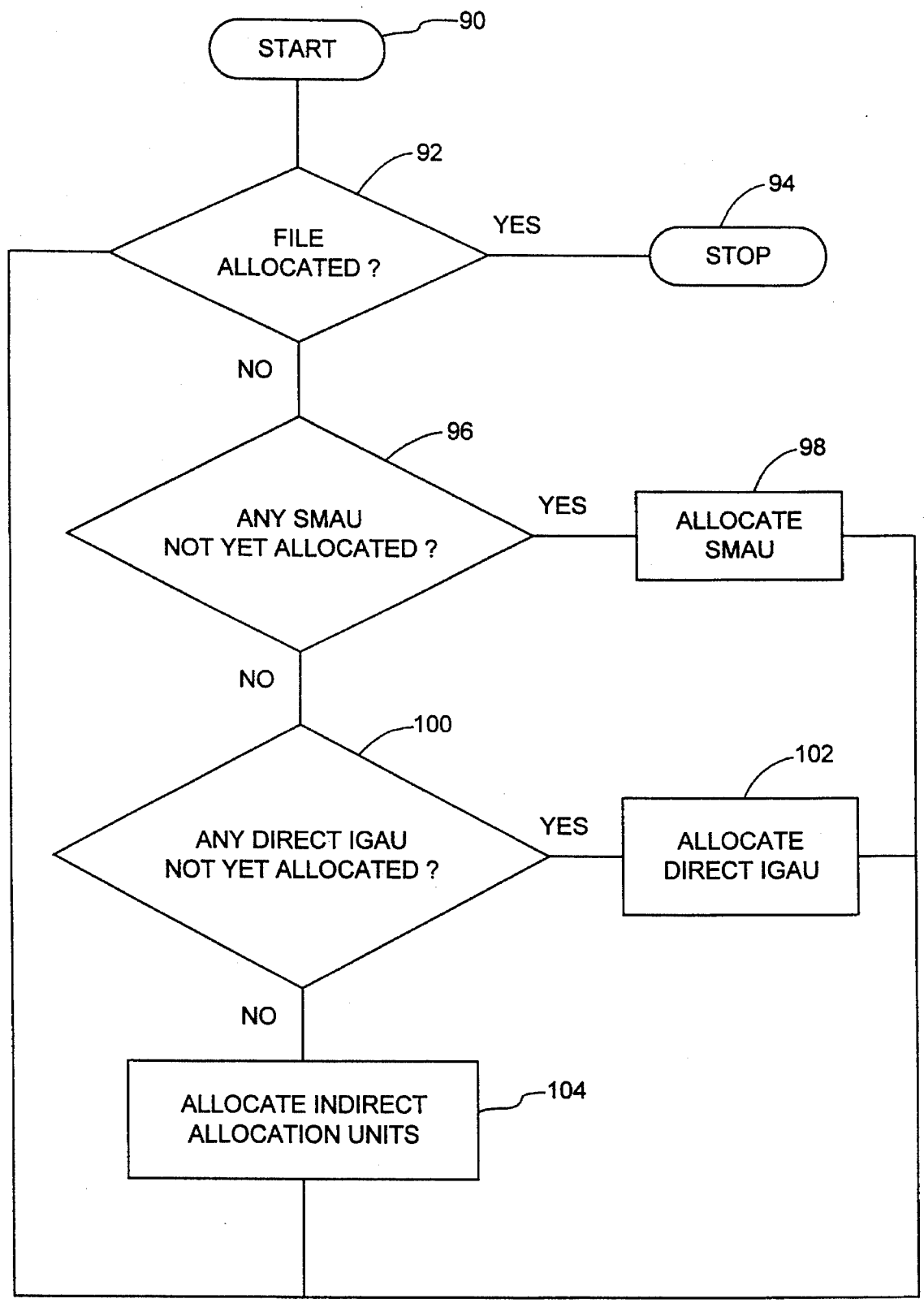
FIG. 4 is a flow chart showing how the dual size allocation units of the present invention are allocated sequentially in response to a file request.
Figure 5:
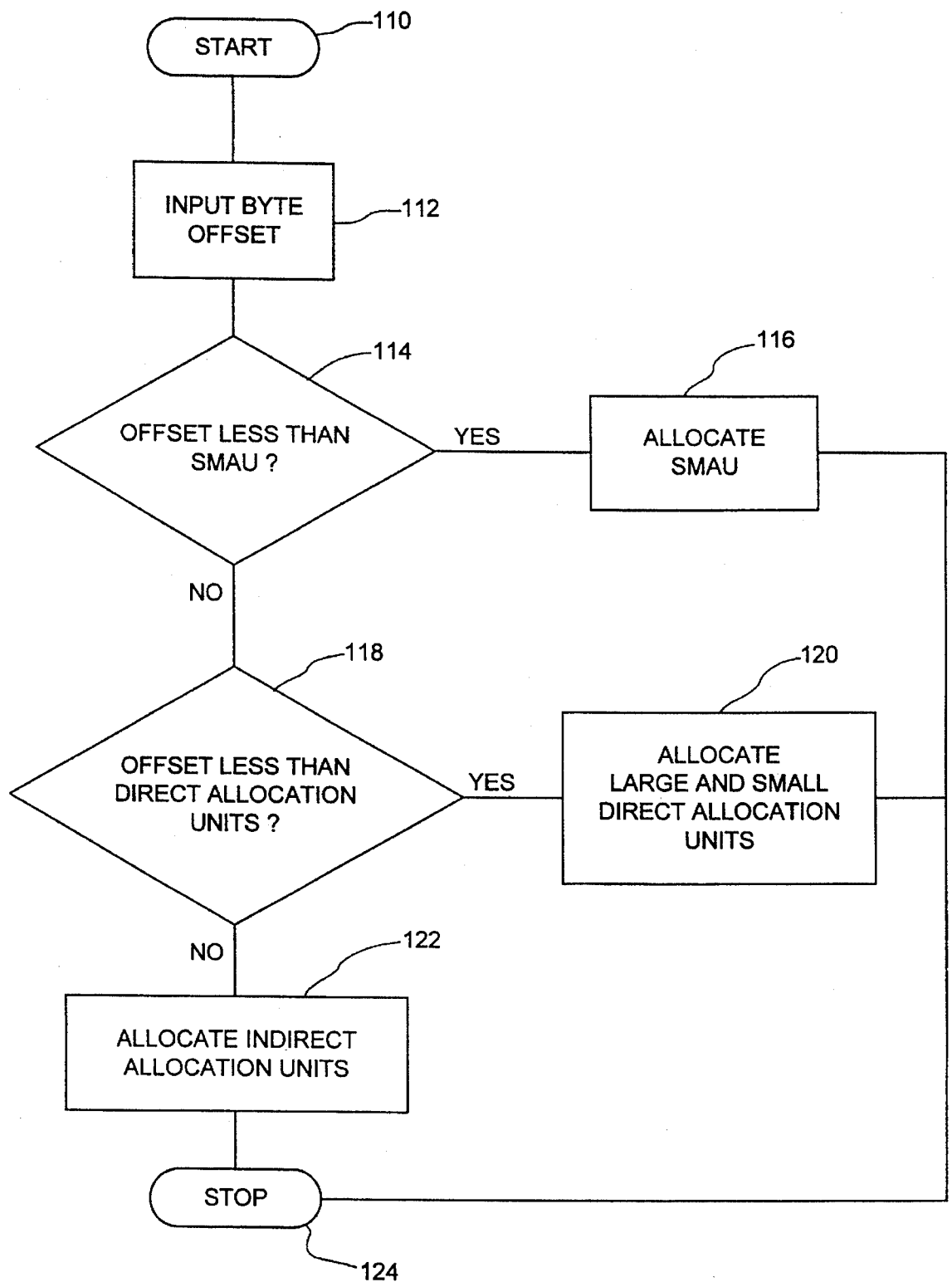
FIG. 5 is a flow chart showing how, in the preferred embodiment, dual size allocation units of the present invention are allocated non-sequentially in response to a request to allocate a file.

Referring to FIGS. 3-5, when the file control processor receives a request to save a file, the file control processor divides the data to be written into logical storage units 52 and saves the file according to a forward allocation method. Following the forward allocation method, the file control processor allocates the logical storage units 52 of the file across the small and large allocation units 74, 76 of the direct allocation units 70 first and then across the large allocation units 76 of the indirect level pointers 72.

Referring to FIG. 4, the storage allocation method for sequentially storing a file in accordance with the present invention begins (step 90) by testing whether the file has been completely allocated (step 92). If the file has been completely allocated, the process ends (step 94).

If the file has not been completely allocated, the file control processor tests whether all the small allocation units 74 of the direct allocation units 70 have been allocated (step 96). If not, the file processor allocates one or more small allocation units 74 of the direct allocation units 70 to storing file data (step 98).

If all of the small allocation units 74 of the direct allocation units 70 have been allocated, the file processor tests whether all the large allocation units 76 of the direct allocation units 70 have been allocated (step 100). If not, the file processor allocates one or more large allocation units 76 of the direct allocation units 70 to storing file data (step 102).

If all of the large allocation units 76 of the direct allocation units 70 have been allocated, the file processor allocates one or more large allocation units 76 referenced by an indirect level pointer 72 (step 104). The file processor continues this allocation process (steps 92-104) until the file is completely allocated.

It will be understood by those skilled in the art that a file may be stored non-sequentially through repetitive allocation of the logical storage units 52 of a file by the file processor in response to an allocation request for each storage unit 52 based on the byte offset. Referring to FIG. 5, in the preferred embodiment, the storage allocation method for non-sequentially storing a file in accordance with the present invention begins (step 110) by inputting the byte offset for the logical storage unit 52 (step 112). Next, the file processor tests whether the byte offset is less than the size of a small allocation unit 74 (step 114). If the byte offset is less than the size of the storage capacity of the small allocation unit 74, the file processor allocates a small allocation unit (smau) 74 of the direct allocation units 70 to storing the file data in that logical storage unit 52 (step 116) and stops (step 124).

If the byte offset is not less than the size of a small allocation unit 74, the file processor tests whether the byte offset is less than the size of the storage capacity of both the large allocation units 76 and the small allocation units 74 of the direct allocation units 70 (step 118). If the byte offset is less than the capacity of the direct allocation units 70, the file processor first allocates the small allocation units 74 and then the large allocation units 76 of the direct allocation units 70 until sufficient space for the logical storage unit 52 has been allocated (steps 120, 124). Those skilled in the art will recognize that allocating the small allocation units 74 and then the large allocation units 76 of the direct allocation units 70 favors the allocation of contiguous areas of physical storage whereby enhancing access performance and improving the utilization of storage resources. In addition, partitioning of the physical storage device into storage areas corresponding to the small allocation units 74 and large allocation units 76 enhances data transfer rates by reducing file fragmentation and minimizes the repositioning the read mechanism in each storage device.

If the byte offset is not less than the capacity of the direct allocation units 70, the file control processor allocates one or more large allocation units 76 referenced by an indirect level pointer 72 (step 122). As those skilled in the art will understand, the file control processor allocates a sufficient number of large allocation units 76 through use of the first, second and third level indirect pointers 78, 80, 82 to contain the data indicated by the byte offset and then ends the allocation process (step 124).

Although the description of the preferred embodiment has been presented, it is contemplated that various changes could be made without deviating from the spirit of the present invention. Accordingly, it is intended that the scope of the present invention be dictated by the appended claims, rather than by the description of the preferred embodiment.

What is claimed is:

1. In a file system that is part of an operating system executing in a computer processing system that includes a secondary storage system, the secondary storage system including first storage allocation units, each representing a space of a first predefined size in the secondary storage system and second allocation units, each representing a space of a second predefined size, the second predefined size being greater than the first predefined size, a method for allocating logical storage blocks of a file to the secondary storage system in response to a request to store a file, the method comprising the computer-implemented steps of:

(a) allocating one or more of a first number of the first storage allocation units until a total amount of the space represented by the first storage allocation units which have been allocated is greater than or equal to the space required by the logical storage blocks of the file or a total number of the allocated first storage allocation units is equal to the first number of first storage allocation units; and (b) if the total number of allocated first storage allocation units is equal to the first number of first storage allocation units, then allocating a second number of second storage allocation units until a total amount of the space represented by the allocated first storage allocation units and allocated second storage allocation units is greater than or equal to the space required by the logical storage blocks of the file.

2. The method of claim 1 wherein the second number of storage allocation units includes a first set of storage allocation units addressed by direct pointers and a second set of storage allocation units addressed by indirect pointers and wherein step (b) comprises:

(b1) if the total number of allocated first storage allocation units is equal to the first number of first storage allocation units, then allocating one or more storage allocation units of the first set until a total amount of the space represented by the allocated first storage allocation units and a total number of allocated storage allocation units of the first set is greater than or equal to the space required by the logical storage blocks of the file or the total number of the allocated storage allocation units of the first set is equal to a total number of storage allocation units of the first set; and (b2) if the total number of the allocated storage allocation units of the first set is equal to the total number of storage allocation units of the first set, then allocating one or more logical storage units of the second set until a total amount of space represented by the allocated first storage allocation units, allocated storage allocation units of the first set and the total number of allocated storage allocation units of the second set is greater than or equal to the space required by the logical storage blocks of the file.

3. In a file system that is part of an operating system program executing in a computer processing system that includes a secondary storage system, a method for allocating logical storage units in response to a request to store a file of a given size, the method comprising the computer-implemented steps of:

(a) identifying a first number of first logical storage units and a second number of second logical storage units, each of the first logical storage units representing a space of a first predefined size in the secondary storage system in which to store the file, each of the second logical storage units representing a space of a second predefined size in the secondary storage system in which to store the file, the second predefined size is greater than the first predefined (b) allocating one or more of the first number of first logical storage units until a total amount of the space represented by the allocated first logical storage units is greater than or equal to the given size of the file or a total number of the allocated first logical storage units is equal to the first number of first logical storage units; and (c) if the total number of allocated first logical storage units is equal to the first number of first logical storage units, then allocating one or more of the second number of second logical storage units until a total amount of the space represented by the allocated first logical storage units and allocated second logical storage units is greater than or equal to the given size of the file.

4. The method of claim 3 wherein the operating system program is the UNIX® System V operating system.

5. The method of claim 3 wherein the secondary storage system is a data server operating under the UNIX® System V operating system in a distributed processing network environment.

6. The method of claim 3 wherein the first predefined size of the first logical storage units is 1K byte in size and the second predefined size of the second logical storage units is 16K byte in size.

7. The method of claim 3 wherein the second number of second logical storage units includes a first set of logical storage units addressed by direct pointers and a second set of logical storage units addressed by indirect pointers and wherein step (c) comprises:

(c1) if the total number of allocated first logical storage units is equal to the first number of first logical storage units, then allocating one or more second logical storage units of the first set until a total amount of the space represented by the total number of allocated first logical storage units and allocated second logical storage units of the first set is greater than or equal to the given size of the file or the total number of the allocated second logical storage units is equal to a number of logical storage units of the first set; and (c2) if the total number of the allocated second logical storage units is equal to the number of second logical storage units of the first set, then allocating one or more second logical storage units of the second set until a total mount of space represented by the total number of allocated first logical storage units, second logical storage units of the first set and second logical storage units of the second set is greater than or equal to the given size of the file.

8. In a file system that is part of an operating system program executing in a computer processing system that includes a secondary storage system, a system for allocating logical storage units in the secondary storage system in response to a request to store a file of a given size comprising:

control means for storing a table of contents for the file identifying one or more first logical storage units and one or more second logical storage units, each of the first logical storage units representing a space of a first predefined size in the secondary storage system in which the file is stored, each of the second logical storage units representing a space of a second predefined size in the secondary storage system in which the file is stored, the second predefined size is greater than the first predefined size;

first allocation means for allocating one or more of a first number of first logical storage units until a total amount of the space represented by the allocated first logical storage units is greater than or equal to the given size of the file or a total number of the allocated first logical storage units is equal to the first number of first logical storage units; and second allocation means for allocating a second number of second logical storage units if the total number of allocated first logical storage units is equal to the first number of first logical storage units until a total amount of the space represented by the allocated first logical storage units and allocated second logical storage units is greater than or equal to the given size of the file.

9. The file system of claim 8 wherein the operating system program is the UNIX® System V operating system.

10. The file system of claim 8 wherein the secondary storage system is a data server operating under the UNIX® System V operating system in a distributed processing network environment.

11. The first predefined size of the first logical storage units of claim 8 being 1K byte in size and the second predefined size of the second logical storage units being 16K byte in size.

12. The system of claim 8 wherein the second number of logical storage units includes a first set of logical storage units addressed by direct pointers and a second set of logical storage units addressed by indirect pointers and wherein the second allocation means comprises:

direct allocation means for allocating one or more second logical storage units of the first set if the total number of first number of first logical storage units is equal to the first number of first logical storage units until a total amount of the space represented by the first logical storage units and allocated second logical storage units of the first set is greater than or equal to the given size of the file or until the total number of allocated second logical storage units is equal to the number of logical storage units of the first set; and indirect allocation means for allocating one or more second logical storage units of the second set if the total number of allocated second logical storage units is equal to the number of logical storage units of the first set until a total amount of the space represented by the first logical storage units and second logical storage units is greater than or equal to the given size of the file.

\* \* \* \* \*

UNITED STATES PATENT AND TRADEMARK OFFICE
CERTIFICATE OF CORRECTION

PATENT NO. : 5,454,103
DATED : September 26, 1995
INVENTOR(S) : Harriet G. Coverston, et al.

It is certified that error appears in the above-indentified patent and that said Letters Patent is hereby corrected as shown below:

Col. 1, line 50, delete "readings" and insert -- reading --, therefor;

Col. 2, line 54, delete the second occurence of the word "the", and insert -- be -- therefor;

Col. 2, line 66, delete "flies" and insert -- files -- therefor;

Col. 9, line 48, after "predefined", insert -- size; -- therefor.

Signed and Sealed this

Second Day of April, 1996

Attest:

BRUCE LEHMAN

Attesting Officer

Commissioner of Patents and Trademarks